Feb. 26, 1935.    H. L. SMITH    1,992,331
SINGLE FILE FEEDING DEVICE
Filed April 26, 1932    2 Sheets-Sheet 2
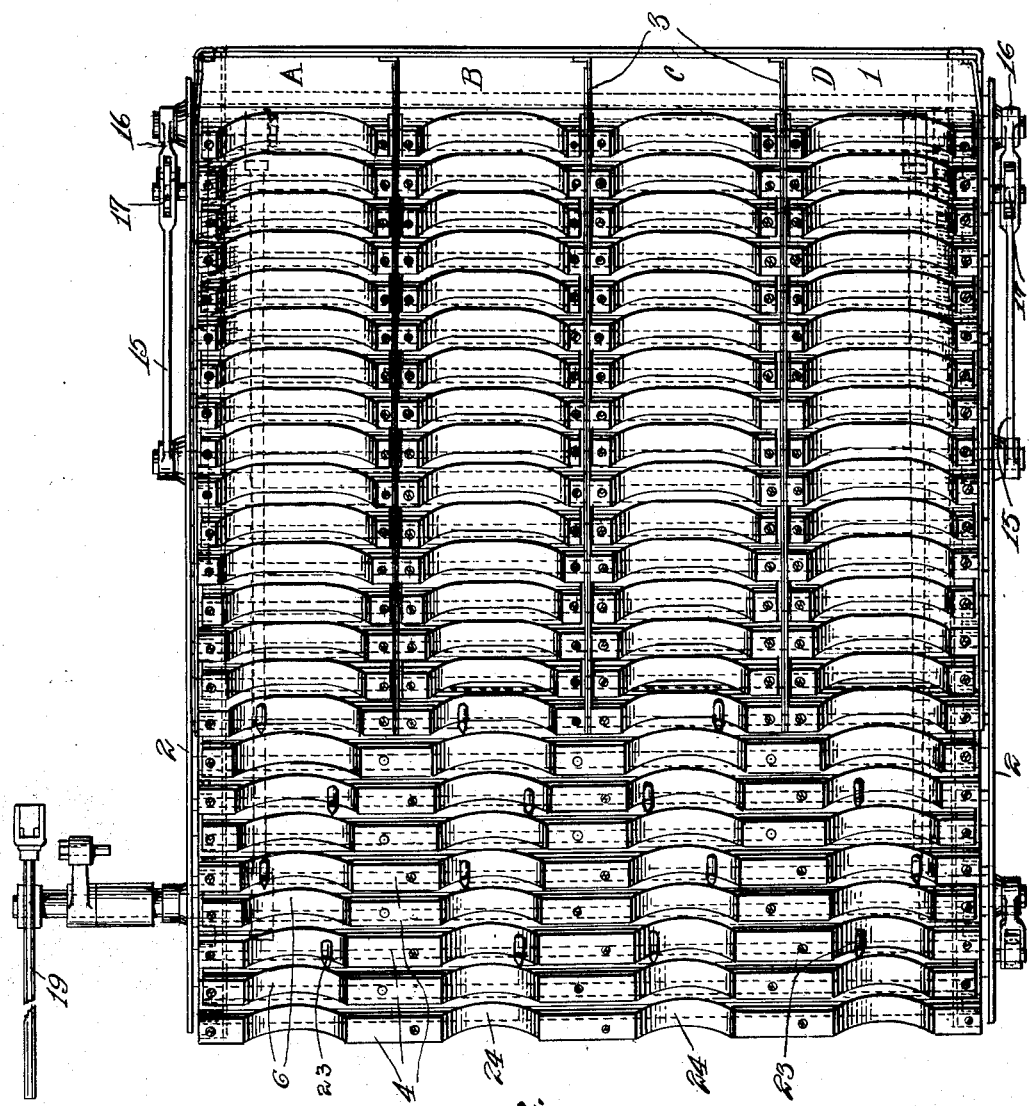
Inventor
Henry L. Smith
By J. H. Graham
Attorney Patented Feb. 26, 1935

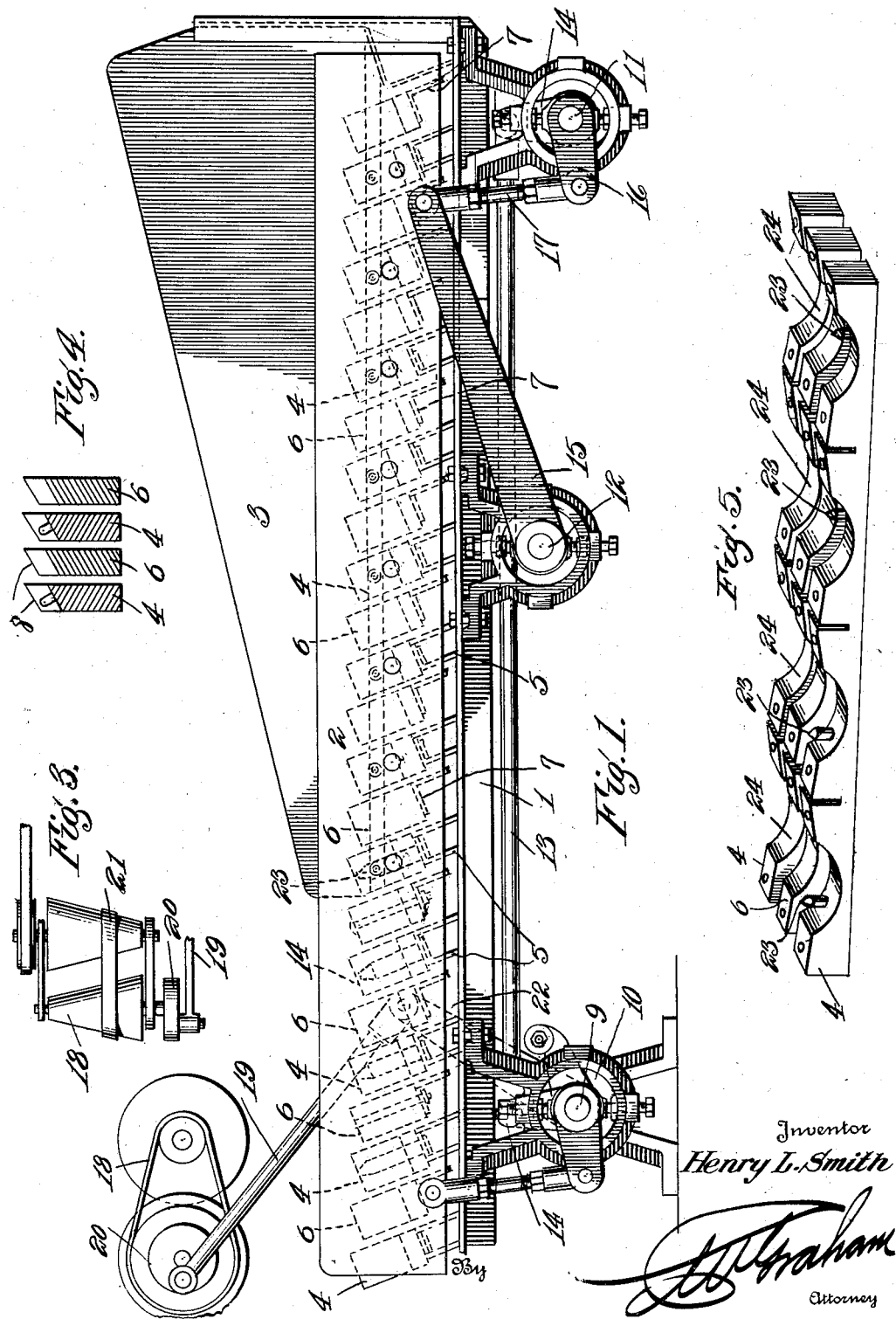

1,992,331

UNITED STATES PATENT OFFICE 1,992,331

SINGLE FILE FEEDING DEVICE

Henry L. Smith, Dunedin, Fla., assignor to Food Machinery Corporation, San Jose, Calif., a corporation of Delaware Application April 26, 1932, Serial No. 607,643

14 Claims. (Cl. 198—219)

This invention relates to a device for marshalling a miscellaneously arranged group of articles to move in single file relation and is particularly adapted to the feeding of fruit to cleaning or sizing machine, or to machines of any character where single articles are operated upon successively.

In the feeding of articles for such purposes it is desirable that the means involved will receive groups of miscellaneous articles of varying size and character so long as the articles approach a cylindrical or spherical contour so that they may be made to roll along a predetermined pathway. It is also desirable in devices of this character to provide mechanism that will restrain the movement of the articles at the same time that it marshals them into single file procession.

It is also desirable that a device of this character will receive globular or like articles in a series of groups and marshalling each group to move in single file relation through a series of predetermined paths, thus giving capacity to the apparatus.

It is also desirable that the mechanism adopted to direct the movement of the articles in single file relation be such that the articles will in no manner be injured or defaced in their movement and arrangement into single file relation.

It is also desirable in machines of this character that the capacity and speed of delivery of articles in single file movement may be regulated solely by the speed at which the machine is driven.

The apparatus disclosed by this application comprises generally, a horizontally box shape frame work in which are mounted series of fixed and movable bars having specially shaped surfaces and interrupting devices associated therewith for controlling the movement of articles thereover.

Each alternate bar is movable in the series and the movable bars are all mounted on a movable frame work so that they may all be moved in unison. The drive means for operating the device may also be variable so that the speed of delivery of articles from the apparatus may be regulated as desired. Means are also provided for receiving groups of miscellaneous articles and directing them to the single file marshalling elements.

It is therefore a principal object of the invention to provide an apparatus for directing single articles from a group of articles into single file movement and delivery.

It is also an object of the invention to provide an apparatus for directing a series of lines of single articles from a series of groups of articles.

It is also an object of the invention to provide an apparatus for directing articles to move in single file relation by means that will not abrade or injure the surfaces thereof.

It is also an object of the invention to provide and apparatus for directing articles along a single file pathway wherein the articles are retarded in their movement so that their delivery can be accurately timed.

It is a further object of the invention to provide an apparatus for directing articles into single file relation wherein the speed of the directing means will determine the capacity of the apparatus.

With such objects in view as well as other advantages inherent in the invention, consisting in the parts and combinations hereinafter set forth and claimed, it is understood that the several necessary elements and combinations constituting the same may be varied in their proportions, placement and general arrangement without departing from the scope and nature of the invention, and in order to make the invention more clearly understood there are shown, somewhat diagrammatically, in the accompanying drawings means and mechanism for placing the same in concrete form, without limiting the improvements to the particular constructions shown to illustrate the invention.

Referring now to the drawings Figure 1 represents a side elevation of an apparatus embodying the invention.

Figure 2 is a plan of Figure 1.

Figure 3 is a diagram of a variable drive device.

Figure 4 represents a modification of the positioning of the operating feed bars.

Figure 5 represents a perspective view of several of the feed bars showing their operative relation and the general position of the single file controlling devices.

The numeral 1 represents the main frame member on which the entire apparatus is mounted. This frame member is a casting that extends entirely across the machine. 2 represents the movable frame member which carries the movable feed bars. 3 are a series of division walls separating the machine into a series of lanes for single file travel and for receiving the groups of articles in a promiscuous manner from which single articles are selected by the mechanism and caused to move in single file relation. The bars marked 4 are the fixed bars and are carried by the main frame member 1 through the medium of the angular standards 5. The movable bars are indicated by the numeral 6 and are mounted in the frame member 2. Both of the series of bars 4 and 6 extend laterally across the machine and lie in spaced parallel relation, their top edges forming the sole support for fruit or other articles being handled, they are supported in their relative positions by the angle members 7 which in turn are secured to the frame member 2. The feed bars 4 and 6 are shown in the main views as being slightly inclined forward toward the direction of travel of the articles, which inclination permits utilizing the square edges of the bars as feeding elements and as the movable bars reciprocate they give a forward push to the articles to cause them to roll over the fixed bars for each step of reciprocation. In Figure 4 is shown a slight modification of the positioning of the bars wherein the bars may be positioned in a vertical parallel relation and have their top edges beveled as at 8 which will cause the articles to roll forward when lifted by the movable bars.

Extending across the delivery and of the apparatus is a main drive rock shaft 9 mounted in suitable bearing 10 carried by the main frame member 1. Mounted across the receiving end of the apparatus is a cross rock shaft 11, and intermediate these two rock shafts is another rock shaft 12. The rock shafts 9 and 11 are connected by the rod 13 to move in unison. The rods 13, there being two of them, one adjacent each side of the machine are operatively connected to the shafts 9 and 11 by the rocker arms 14, of which there are two on each shaft.

The rock shaft 12 carries control arms 15, one on each side of the machine, the purpose of the arms 15 being to cause the movement of the frame work 2 to follow substantially the inclination of the movable feed bars 6. The ends of the arms 15 connect with rocker arms 16 through the medium of the links 17.

The machine may be conveniently operated through the variable speed device 18 shown connected to the drive rod 19, which in turn is driven from a crank disk 20 on the end of one of the shafts of the variable speed device 18. The variable speed being controlled by the shifting of the belt 21 along the cone pulleys of the device 20. The drive end of the rod 19 connects with a crank arm 22 attached on the drive end of the shaft 9.

The special feature of the machine that marshals the articles to assume a single file relation rests in the location of interfering pins 23 set in the faces of the fixed bars 4, and to make the articles roll to and against the pins 23 the trackways over the tops of the bars are formed by producing concave areas along the bars as at 24. The pins 23 are placed in staggered relation along the concave pathways so that the articles will be intercepted by each pin as they pass and somewhat retarded in their forward movement which action causes them to assume a single file relation.

Operation

By reference to the drawings it will be seen in Figure 2 that four feed lanes have been provided and are indicated by the letters A, B, C and D. It will also be noted in this view that the concave top edges of the feed bars form a graduated runway so that the articles are caused to assume a single file relation due to this graduation and by placing the pins 23 in staggered relation along the narrow portion of the runways the articles are prevented from clogging and crowding the runway as they are moved along by the feed bars.

Articles such as oranges or fruit or any round or rollable article are dumped promiscuously into the lanes at A, B, C and D. The crank disk 20 rotating continuously will oscillate the rod 19 and through the links and connections described will lift the whole frame work carrying the movable feed bars 6. This moves all of the feed bars fastened to this frame member 2 and thereby lifts the mass of fruit or articles in each of the runways. This lifting of the mass causes the articles along the forward edge to start moving along and over the adjacent fixed bars, rolling thereover by gravity as soon as they are lifted by the movable bars. The throw of the crank disk 20 is just sufficient to lift the frame member 2 and the bars attached thereto so that the top edges of the bars will be slightly above the top edges of the fixed bars when any articles free to roll will roll from one movable bar over the next fixed bars and will be stopped by contacting with the next movable bar.

The position of the frame member 2 in Figure 2 is not quite at its lowest as will be seen by noting the position of the crank pin on the disk 20. When the frame 2 is at its lowest position the top edges of the bars 6 will be on a line with the top edges of the fixed bars so that the articles will roll from each fixed bar onto the top edge of the adjacent movable bar, then when the movable bars are lifted the articles resting thereon will also be lifted and caused to roll onto the next fixed bar and finally onto the next movable bar, which sequence of movement causes a gradual, slightly interrupted forward movement of the articles.

The staggered pins 23 arranged along the narrow ends of the runways interrupt the forward movement of the articles and cause them to form into single line arrangement since the narrowing runways cause two articles close together to crowd each other but the pin that the outer article encounters retards that article just enough to let the other article move ahead which form the single file arrangement.

The speed at which the frame 2 is oscillated will determine the volume of fruit or articles delivered from the delivery side of the apparatus, and by adjusting the speed of the variable drive device this speed of delivery may be regulated to suit any requirements. The capacity of the machine may also be controlled by increasing or decreasing the runways, more runways at a given speed will deliver more volume than a less number of runways at the same speed.

Having described my invention what I claim as new and desire to secure by Letters Patent is:

1. An apparatus for moving articles along a lane comprising a series of transverse bars forming said lane, each alternate bar of said series being fixed, and the rest of said bars being movable to lift articles resting thereon and cause them to roll from bar to bar with means along said lane for retarding the free movement of said articles to cause them to assume single file relation.

2. An apparatus for moving articles along a lane comprising a series of transverse bars each of said series being alternately fixed and movable, the top edges of said bars forming the sole support for articles moving therealong, each bar having a concave area forming a lane along which said articles may roll, stationary pins located along the path of said articles to retard their movement and cause them to assume single file relation.

3. An apparatus for moving articles along a lane comprising a series of transverse bars each of said bars being in alternate fixed and movable relation, the top edges of said bars forming the sole support for articles resting thereon, each bar having a concave area to form said lane along which said articles roll, means for moving all of the movable bars in unison to lift articles resting thereon and cause them to roll along the top edges thereof with pins in said fixed bars for retarding the free movement of articles therealong to cause said articles to assume single file relation.

4. An apparatus for moving articles along a lane in single file relation comprising a bed member, a movable member arranged adjacent thereto, bars secured to said bed member and bars fixed to said movable member said bars forming a supporting surface for articles, said series of bars having aligned depressed portions to form lanes, means for moving the said movable member and the bars secured thereto to lift articles resting thereon and cause them to roll along said support over said fixed bars with means associated with said depressed portions of said bars to retard the free movement of articles passing therealong to cause said articles to assume a single file relation.

5. An apparatus for moving articles along a pathway in single file relation comprising a frame member, a movable member and a fixed member arranged in superposed relation, transverse bars secured to said fixed member and transverse bars secured to said movable member, the bars on said members resting in alternate relation to form a supporting surface for articles, said supporting surface being corrugated to form lanes, means for moving said movable member to lift articles resting on said bars and cause them to roll along said lanes and over said fixed bars, said moving means being variable and means associated with the lanes on said supporting bars to retard the free movement of articles therealong to cause said articles to assume single file relation.

6. An apparatus for moving articles in single file relation along a pathway comprising a frame member and a movable member arranged adjacent each other, transverse bars associated with said members forming the sole support for articles, means for moving said movable member and bars associated therewith to cause articles to move over all of said bars, the supporting surface of said bars being corrugated to form lanes, interrupting means associated with said lanes to retard the free movement of articles to cause them to assume single file relation, said means for moving said movable member being adapted to variable speed to thereby regulate the volume of articles moved thereby.

7. An apparatus for moving articles in single file relation comprising a frame member and a movable member arranged adjacent each other, transverse bars associated with said members to form the sole support for articles, said support being corrugated to form lanes, variable means for moving said movable member to lift articles and cause them to roll along said supporting lanes, means associated with said bars for interrupting the free movement of articles therealong to cause said articles to assume single file relation, said moving means including rock shafts and links to move and support said movable member in operative relation with said frame member.

8. An apparatus for moving articles in single file relation comprising means for segregating articles from a mass of promiscuously arranged articles and marshalling them into single file relation including a series of bars arranged to form the sole support for articles, said support being corrugated to form lanes, means for moving each alternate bar in said series to lift articles and cause them to roll therealong, means located along the lanes followed by said articles to interrupt the free movement of articles therealong and cause said articles to assume single file relation, the means for moving said bars being variable whereby the volume of articles moved thereby may be controlled.

9. An apparatus for feeding globular articles in single file relation from a group of promiscuously arranged articles comprising fixed and movable means forming a supporting means for articles and over which articles are moved, aligned depressed portions in said fixed and movable means forming lanes along which the articles are moved and guided, obstructive means associated with said lanes to contact with articles that are crowding each other and cause them to assume single file relation.

10. An apparatus for moving globular articles in single file relation from a group of promiscuously arranged articles comprising fixed and movable means forming a support for articles and over which articles are moved, lanes formed in said supporting means to guide articles moved therealong, said movable supporting means successively contacting with articles to lift and move them along said lane, obstructive means associated with said lanes to contact with articles that are crowding each other and cause them to assume single file relation.

11. An apparatus for moving globular articles along a lane comprising fixed and movable members forming said lane, said movable members successively lifting said articles to roll them over said fixed members and thereby cause them to move along said lane, fixed means along said lane for interrupting the free movement of articles therealong and causing said articles to be retarded in their advance and assume single file relation.

12. In an apparatus for feeding rollable articles in single file relation, a conveyor including a series of supporting bars arranged in side by side relation and provided with concavities arranged to form a guide channel extending transversely of the bars, means for imparting relative up and down movement to alternate bars to advance rollable articles along said channel across the bars, and means projecting into said channel to obstruct the passage of said articles along one side thereof and cause them to assume single file relation.

13. An apparatus for feeding rollable articles in single file relation, a conveyor including a series of supporting bars arranged in side by side relation and provided with concavities arranged to form a guide channel extending transversely of the bars, means for imparting relative up and down movement to alternate bars to advance rollable articles along said channel across said bars, and means projecting into said channel to partially obstruct the same whereby to prevent the passage of articles abreast of each other and cause them to assume single file relation.

14. An apparatus for feeding rollable articles in single file relation, a conveyor including a series of supporting bars arranged in side by side relation and provided with concavities arranged to form a guide channel extending transversely of the bars, means for imparting relative up and down movement to alternate bars to advance rollable articles along said channel across the bars, and a plurality of pins projecting into said channel from alternate sides thereof to prevent the passage of articles abreast of each other and cause them to assume single file relation.

HENRY L. SMITH.